US008147701B2

(12) United States Patent
Cervantes et al.

(10) Patent No.: US 8,147,701 B2
(45) Date of Patent: Apr. 3, 2012

(54) IMMOBILIZED REDOX MEDIATORS FOR THE TREATMENT OF CONTAMINATED WATERS AND GAS EMISSIONS

(75) Inventors: Francisco J. Cervantes, San Luis Potosi (MX); Jose Rene Rangel-Mendez, San Luis Potosi (MX); Alberto Garcia-Espinosa, Veracruz (MX); Maria Antonieta Moreno Reynosa, Col. El Carmen Tuxtla Gutierrez Chiapas (MX); Elias Razo-Flores, San Luis Potosi (MX)

(73) Assignee: Instituto Potosino De Investigacion Cientifica y Tecnologica A.C., San Luis Potosi (MX)

( * ) Notice: Subject to any disclaimer, the term of this patent is extended or adjusted under 35 U.S.C. 154(b) by 562 days.

(21) Appl. No.: 12/197,350

(22) Filed: Aug. 25, 2008

(65) Prior Publication Data

US 2010/0044245 A1 Feb. 25, 2010

(51) Int. Cl.
*C02F 1/461* (2006.01)
(52) U.S. Cl. .................. 210/660; 205/742; 205/746
(58) Field of Classification Search ............... 205/742, 205/746, 748; 210/660
See application file for complete search history.

(56) References Cited

U.S. PATENT DOCUMENTS

| 5,312,590 | A | * | 5/1994 | Gunasingham | 204/403.1 |
| 7,638,228 | B2 | * | 12/2009 | Minteer et al. | 429/401 |
| 2006/0163154 | A1 | * | 7/2006 | Tay et al. | 210/605 |

FOREIGN PATENT DOCUMENTS

JP 50-10291 * 2/1975

OTHER PUBLICATIONS

Ratasuk, N., "Redox Functional Groups of Humic Substances," Ph.D. Dissertation, University of Oklahoma, 2004.*

* cited by examiner

*Primary Examiner* — Chester Barry
(74) *Attorney, Agent, or Firm* — Defillo & Associates, Inc; Evelyn A. Defillo

(57) ABSTRACT

The present invention relates to a treatment process applicable to degrade or transform organic and inorganic pollutants, commonly found in industrial wastewaters, contaminated aquifers and gas emissions, in which reduction or oxidation reactions (e.g. redox reactions) are involved. The treatment concept comprises reactors in which catalysts, with redox mediating properties, have been immobilized on ion exchange resins in order to improve and accelerate the transformation of priority pollutants by chemical or biological means.

3 Claims, 6 Drawing Sheets

IMMOBILIZED REDOX MEDIATORS FOR THE TREATMENT OF CONTAMINATED WATERS AND GAS EMISSIONS

FIELD OF INVENTION

The present invention relates to a treatment process applicable to degrade or transform organic and inorganic pollutants, commonly found in industrial wastewaters, contaminated aquifers and gas emissions, in which reduction or oxidation reactions (e.g. redox reactions) are involved.

The treatment concept comprises reactors in which catalysts, with redox mediating properties, have been immobilized on ion exchange resins in order to improve and accelerate the transformation of priority pollutants by chemical or biological means.

BACKGROUND OF THE INVENTION

The chemical and petrochemical industry produces worldwide thousands of compounds each year and is still in expansion. The global market of this sector is huge and only during the first 9 months of 2004, the sales in the USA summed up US $110.4 billion for 26 companies of the chemical sector.

Unfortunately, linked to the great economical benefits obtained from the chemical and petrochemical production, large volumes of wastewaters and gas emissions containing many different toxic and recalcitrant priority pollutants are being discharged (Razo-Flores et al. 2006). Priority pollutants refer to industrial chemicals, which have serious effects on the environment and on public health and thus, are listed by the Environmental Protection Agency of USA. Among the priority pollutants generated by different industrial sectors are compounds, such as azo dyes, nitroaromatics, chlorinated aliphatic compounds, chlorinated aromatics and metalloids, which remain unaffected in conventional aerobic wastewater treatment systems. However, under anaerobic conditions, these contaminants can undergo reductive transformations generally forming compounds, which are aerobically biodegradable (Field et al. 1995). During the last two decades, evidence accumulated showing the potential to convert electron-withdrawing pollutants in high-rate anaerobic bioreactors, such as upflow anaerobic sludge bed (UASB) and expanded granular sludge bed (EGSB) systems (Cervantes et al. 2001; dos Santos et al. 2005). However, reductive transformation of many different recalcitrant compounds proceeds very slowly due to electron transfer limitations and to toxicity effects leading to poor performance or even collapse of anaerobic bioreactors (van der Zee et al. 2001).

Quinones, redox active groups very abundant in humic substances, have been proved to accelerate the transfer of electrons during the reductive (bio)transformation of a wide variety of priority pollutants, increasing the reductive conversion rates by one to several orders of magnitude (Field & Cervantes 2005). Quinoid redox mediators not necessarily have to be supplied abundantly in anaerobic bioreactors to accelerate reductive transformation of electron-withdrawing contaminants, as they are being regenerated during the transfer of electron from an electron donor to the pollutants. Nevertheless, continuous addition of redox mediators should be supplied in anaerobic bioreactors in order to achieve increased conversion rates, which raise the costs of treatment.

An approach to eliminate the prerequisite of continuous supply of redox mediators is to create a niche for their immobilization in anaerobic reactors. However, scarce attempts to apply immobilized quinoid redox mediators for the anaerobic reduction of electron-withdrawing pollutants have been reported. One of the alternatives available considers the application of activated carbon as a natural source of quinoid redox mediators and its potential for reducing azo dyes have been explored in anaerobic bioreactors (van der Zee et al. 2003). However, the catalytic effects of activated carbon gradually decrease attributed to its long-term wash-out from the reactor. Moreover, the redox active groups in activated carbon have a redox potential, which can effectively transfer electrons to a limited number of pollutants. Another immobilizing approach reported is to insert quinoid redox mediators within different materials through polymerization procedures (Guo et al. 2007). Through this immobilizing technique, quinoid redox mediators remain entrapped within the synthesized polymer. Disadvantages of this strategy are: 1) mass transfer limitations since a major part of the redox mediators are embedded within the polymeric material making its accessibility dependent on diffusion; 2) gradual lost of redox catalysts due to disruption of the polymeric material owing to weak mechanical strength of the materials explored so far.

No attempts to immobilize quinones on exchange resins have been reported and a number of advantages can be underlined with this strategy. By properly selecting an ion exchange resin and a quinoid redox mediator, two major goals can be achieved: 1) stable attraction between active functional groups in ion exchange resins and the redox mediator; and 2) redox active groups (e.g. quinones) remain available for catalysis, because other functional groups, with a greater attraction for the exchange resin, can link both materials. Furthermore, a redox mediator with the proper structure and redox potential to effectively transfer electrons from an external electron donor to a specific electron-withdrawing pollutant could be selected. The last observation is particularly important considering that redox properties greatly differ among the distinct catalysts available in the market, resulting in different impacts towards the conversion of a particular pollutant (Field & Cervantes 2005). Moreover, quinoid redox mediators could be carefully immobilized on the surface of non-porous ion exchange resin particles decreasing mass transfer limitations during catalysis. Additional benefits of considering ion exchange resins is that several of these polymeric materials have the proper mechanical strength to prevail unaffected in high-rate anaerobic reactors and a specific weight, which prevents their wash-out during continuous operation of anaerobic bioreactors.

There are several advantages of considering quinoid redox mediators for reductive transformation of electron-withdrawing contaminants. Quinones are very abundant in humus, which is the most plentiful organic fraction accumulating in terrestrial and aquatic environments. Therefore, humic substances represent a plentiful and cost-effective source of quinoid redox mediators. Moreover, humic substances have a remarkable stability in the environment. Indeed, high molecular weight humic materials have a residence time longer than 500 year (Stevenson 1994).

SUMMARY OF THE INVENTION

The present invention relates to a treatment process appropriate to convert priority pollutants, which are susceptible to redox transformation by chemical or biological means. The treatment concept comprises reactors in which catalysts, with redox mediating properties, have been immobilized on ion exchange resins in order to improve and accelerate the degradation or transformation of priority pollutants susceptible to redox (bio) transformation.

In the present invention, ion exchange resins were selected based on their physical-chemical properties, their capacity to immobilized quinoid redox mediators, and on the physical and chemical stability of the ion exchange resin-quinones link. In the present work, different quinoid redox mediators have successfully been immobilized in ion exchange resins. Immobilized quinones were physically and chemically stable within a large range of pH (2 to 10) and temperature (10-65° C., preferably 25-55° C.). Moreover, the mechanical strength and specific weight of the saturated ion exchange resins prevented their disruption and wash-out from fluidized reactors operated at high hydraulic loading rates (up to 30 $m^3/m^2$-h).

The catalytic effects of immobilized quinones were tested on the reductive decolorization of different azo dyes by anaerobic granular sludge. Sterile controls in which quinone-saturated ion exchange resins were incubated with different azo dyes did not show any reduction of the azo compounds tested. In biologically active incubations, immobilized quinones accelerated the rate of reductive decolorization of azo dyes up to ~9-fold, compared to controls lacking quinones. Furthermore, immobilized quinones preserved their catalytic input after at least 5 repeated cycles showing the stability of the ion exchange resin-quinone connection. The treatment process described here could be extrapolated to the redox transformation of several priority pollutants commonly found in industrial wastewaters, contaminated aquifers and gas emissions. The contaminants, which could be converted by this treatment process include, although not exclusively: azo compounds, polyhalogenated aliphatic and aromatic pollutants, organic compounds including nitro groups in their structure, oxidized metalloids and radionuclides. Furthermore, the immobilized quinoid redox mediators described in the present invention can also be applied for the treatment of gas emissions containing contaminants susceptible to redox transformation by chemical of biological means.

In light of the above, the present invention comprises a method for binding redox mediators to ion exchange resins, comprising saturating said ion exchange resin with said redox mediator by electrostatic attraction until reaching adsorption equilibrium by constant stirring. Said are selected from quinones or humic substances, wherein said quinones include functional groups selected from sulphate, phosphate or amino, and wherein said humic substances have been modified with functional groups selected from sulphate, phosphate or amino.

A further aspect of the invention describes and claims a treatment process of electron-withdrawing pollutants, comprising contacting said pollutant with a redox mediator immobilized to a ion exchange resin and biologically active sludge, wherein said redox mediators are selected from quinones or humic substances. Furthermore said electron-withdrawing pollutants are selected from azo compounds, polyhalogenated aliphatic and aromatic pollutants, organic compounds including nitro groups in their structure, oxidized metalloids, radionuclides or volatile compounds. It should be stressed said electron-withdrawing pollutants are in industrial wastewaters, contaminated aquifers and gas emissions. It is important to emphasize that said quinones include functional groups selected from sulphate, phosphate or amino, and said humic substances have been modified with functional groups selected from sulphate, phosphate or amino. In a preferred embodiment of the invention said process is carried out at a temperature between 10 and 65° C. An additional embodiment of the process comprises the step of introducing a suitable electron donor and nutrients to promote the biological activity of microorganisms. It is a further embodiment of the process the step of contacting said sludge and said immobilized redox mediators at a hydraulic rate up to 30 m3/m2-h. Also, said process is carried out at a pH between 2 and 10 and in a more preferred embodiment said process is carried out at a temperature between 25 and 55° C.

Use of redox mediators immobilized on ion exchange resins, for treating electron-withdrawing pollutants, is claimed.

In a preferred embodiment, a redox mediator useful in the treatment of electron-withdrawing pollutants, wherein said redox mediator is immobilized in an ion exchange resin according to the method above described, and further exemplified on Example 1 below, is disclosed. Said redox mediators are selected from quinones or humic substances, wherein said quinones include functional groups selected from sulphate, phosphate or amino and wherein said humic substances have been modified with functional groups selected from sulphate, phosphate or amino.

DETAILED DESCRIPTION OF THE INVENTION

Figure 1:
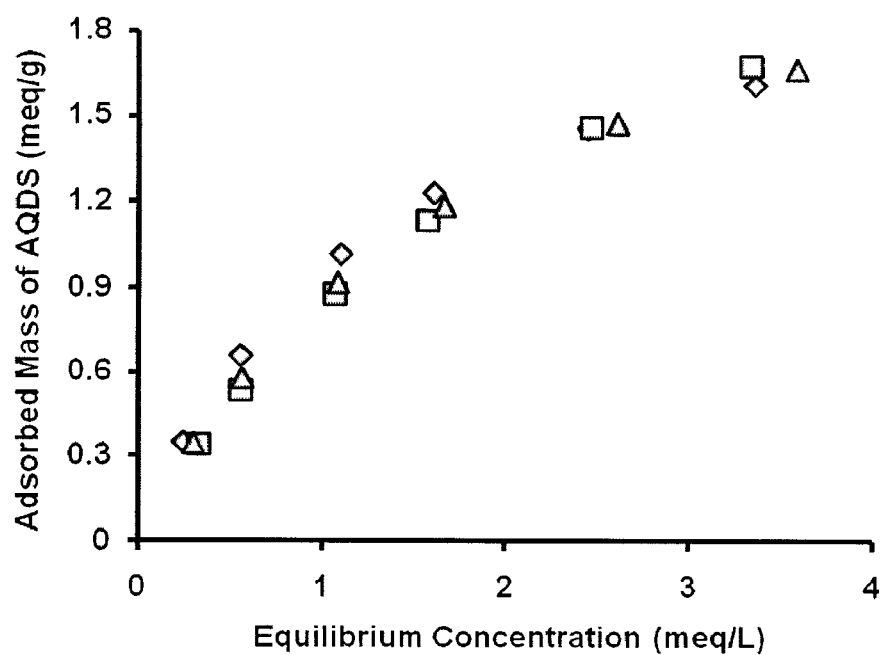
FIG. 1 shows the isotherms of adsorption of AQDS in AMBERJET 4600 CL resin at 25° C. and different pH values. ◊, pH=6; □, pH=7; Δ, pH=8.

Priority pollutants containing electron-withdrawing groups in their structure prevail unaffected in conventional biological aerobic wastewater treatment processes. However, due to the electrophilic nature of these compounds, they can be readily reduced in biological anaerobic wastewater treatment processes (Field et al. 1995). In fact, high-rate anaerobic treatment systems represent suitable technologies to reductively convert electron-withdrawing contaminants (Cervantes et al. 2001; dos Santos et al. 2005). Nevertheless, the reductive transformation of several priority pollutants proceeds very slowly in anaerobic treatment systems due to their recalcitrance and toxicity (van der Zee et al. 2001). It will be clear to one skilled in the art that the transfer of electrons between an external electron donor and the electron-withdrawing pollutants is the rate limiting aspect during the reductive transformation of this kind of compounds.

Quinones, functional active groups very abundant in humus, have been reported to overcome the limitations of electron transfer during the reductive transformation of several distinct electron-withdrawing priority pollutants, increasing the reductive conversion rates by one to several orders of magnitude (Field & Cervantes 2005). Quinoid redox mediators not necessarily have to be supplied abundantly in anaerobic bioreactors to improve and accelerate reductive transformation of electron-withdrawing contaminants, as they are being regenerated during the transfer of electron from an electron donor to the pollutants. Nevertheless, continuous addition of redox mediators should be supplied in anaerobic bioreactors in order to achieve increased conversion rates, which raise the costs of treatment.

An approach to eliminate the prerequisite of continuous supply of redox mediators is to create a niche for their immobilization in anaerobic bioreactors. The present invention relates to a treatment process comprising reactors in which catalysts, with redox mediating properties, have been immobilized in ion exchange resins in order to improve and accelerate the reductive transformation of priority pollutants.

There are a number of advantages that can be underlined with this strategy. By properly selecting an ion exchange resin and a quinoid redox mediator, two major goals can be achieved: 1) stable attraction between active functional groups in ion exchange resins and the redox mediator; and 2) redox active groups (e.g. quinines,) remain available for catalysis, because other functional groups, with a greater attraction for the exchange resin, can link both materials by electrostatic attraction. Furthermore, a redox mediator with the proper structure (e.g. including functional groups selected, but not limited, from sulphate, phosphate or amino and redox potential to effectively transfer electrons from an external electron donor to a specific electron-withdrawing pollutant could be selected. The last observation is particularly important considering that redox properties greatly differ among the distinct catalysts available in the market, resulting in different impacts towards the conversion of a particular pollutant (Field & Cervantes 2005). Moreover, quinoid redox mediators could be carefully immobilized on the surface of non-porous ion exchange resin particles decreasing mass transfer limitations during catalysis (See Example 1). Additional benefits of considering ion exchange resins is that several of these polymeric materials have the proper mechanical strength to prevail unaffected in high-rate anaerobic reactors and a specific weight, which prevents their wash-out during continuous operation of anaerobic bioreactors.

There are also several advantages of considering quinoid redox mediators for reductive transformation of electron-withdrawing contaminants. Quinones are plentiful in humus, which is the most abundant organic fraction accumulating in terrestrial and aquatic environments. Therefore, humic substances represent an abundant and cost-effective source of quinoid redox mediators. Moreover, humic substances have a remarkable stability in the environment. Indeed, high molecular weight humic materials have a residence time longer than 500 year (Stevenson 1994). Specific functional groups can be strategically inserted in humic substances by conventional means in order to promote their immobilization in ion exchange resins. These functional groups can be selected, but not limited to sulphate, phosphate or amino.

The evidence reported in the present invention reveals that immobilized quinoid redox mediators, in different ion exchange resins, maintain their catalytic properties to improve and accelerate the reductive transformation of electron-withdrawing pollutants conducted by anaerobic granular sludge. (See Examples 1 to 9) Therefore, we propose the application of immobilized quinones, in ion exchange resins, for the reductive transformation of electron-withdrawing pollutants in anaerobic bioreactors. The treatment process we propose combines the catalytic properties of immobilized quinoid redox mediators and the biological activity of anaerobic granular sludge. Anaerobic granular sludge is the common inoculum considered for the operation of high-rate anaerobic bioreactors, such as EGSB and UASB treatment systems. However, the treatment concept is not intended be limited to these bioreactor configurations, but to any kind of bioreactor with the proper mixing intensity, such as fluidized sludge reactors, to warrant suitable mass transfer during the catalysis. The physical-chemical properties of the selected ion exchange resins, such as mechanical strength, specific weight, and high capacity to irreversibly adsorb quinones, make them appropriate for applying them in high-rate anaerobic bioreactors for prolonged periods of operation. With this treatment strategy, the prerequisite of continuously adding redox mediators in anaerobic bioreactors is eliminated decreasing the operational costs of anaerobic treatment of contaminated waters.

The results described in the following examples were obtained under experimental conditions mimicking those prevailing in high rate anaerobic bioreactors, such as mixing intensity, sludge concentration, temperature and pH. Furthermore, ion exchange resins, saturated with different quinones, were exposed to extreme hydraulic conditions to determine the robustness of the resins-quinones complexes and the feasibility to keep this material in anaerobic bioreactors. The results revealed that the application of hydraulic velocities as high as 30 m³/m²-h, which are by far higher than those applied in high-rate anaerobic bioreactors, did not cause any wash-out of immobilized quinones or saturated resins.

The treatment concept described in the present invention can also be extrapolated for the conversion of contaminants susceptible to chemical or biological redox transformation in gas emissions. Immobilized quinoid redox mediators in treatment systems could improve and accelerate the conversion of volatile compounds, such as sulfide, through redox reactions.

The following examples are presented as illustrative of the present invention and are not intended to restrict its scope in any way.

EXAMPLE 1

The capacity of an anaerobic granular sludge to reductively decolorize the azo dye, Reactive Red 2 (RR2), was tested in batch incubations in the presence and in the absence of immobilized redox mediators.

The anaerobic granular sludge was obtained from a full-scale UASB reactor treating an industrial wastewater originated from a brewery. The anaerobic sludge was stabilized in a lab-scale UASB reactor, operated at a hydraulic residence time of 12 h, and fed with a basal medium, which composition is as follows (mg/L): $NaHCO_3$ (2000), $NH_4Cl$ (280), $K_2HPO_4$ (250), $MgSO_4 \cdot 7H_2O$ (100), $CaCl_2 \cdot 2H_2O$ (10) and 1 ml/L of trace elements solution. The trace elements solution contained (mg/L): $FeCl_2 \cdot 4H_2O$, (2000); $H_3BO_3$, (50); $ZnCl_2$, (50); $CuCl_2 \cdot 2H_2O$, (38); $MnCl_2 \cdot 4H_2O$ (500); $(NH_4)_6Mo_7O_{24} \cdot 4H_2O$, (50); $AlCl_3 \cdot 6H_2O$, (90); $CoCl_2 \cdot 6H_2O$, (2000); $NiCl_2 \cdot 6H_2O$, (92); $Na_2SeO \cdot 5H_2O$, (162); EDTA, (1000); and 1 ml/L of HCl (36%). Glucose was used as energy source during the stabilization of the sludge at 1000 mg/L. The pH of the influent was adjusted to 7 during the operation of the UASB reactor. The anaerobic sludge showed stable methanogenic activity accounting for >90% of chemical oxygen demand (COD) removal. The stabilized sludge was wash with tap water and sieved before conducting the decolorization assays.

Immobilization of anthraquinone-2,6-disulfonate (AQDS), a redox mediator largely utilized during the reductive transformation of several pollutants (Field & Cervantes 2005), was carried out in an ion exchange resin. The ion exchange resin utilized for the immobilization of AQDS was spherical, non-porous, with an average diameter of 2 mm, and a specific weight of 1.25 g/cm³ (AMBERJET 4600 CL Resin produced by ROHM and HAAS). The ion exchange resin behaves as a strong base in a wide range of pH (4-12) and has a nominal anionic interchange capacity of 1.4 meq/g. Immobilization of AQDS was conducted at pH 7. FIG. 1 shows the isotherms of adsorption of AQDS on the ion exchange resin at different pH values. The range of pH selected is relevant for the operation of wastewater treatment systems.

AMBERJET 4600 CL resin (4 g) was saturated with AQDS using a stock solution of 1500 mg AQDS/l at pH 7. Adsorption equilibrium required 10 days of incubation at 25° C. with a stirring intensity of 180 rpm. After reaching chemical equilibrium, saturated AMBERJET 4600 CL resin was washed at least 3 times until AQDS was not detected in the washing basal medium. The maximum capacity of AQDS adsorption achieved was 1.72 meq/g.

In order to verify the robustness of the immobilizing link between the ion exchange resin and AQDS, the AQDS-saturated resin was washed several times with the basal medium described above. After 5 washing cycles, the ion exchange resin maintained the same capacity to immobilize AQDS evidenced by the lack of AQDS in the washing basal medium.

Furthermore, the AQDS-saturated resin was placed in a lab-scale column, which was fed with the same basal medium utilized during the washing procedure. Extreme hydraulic lading rates were imposed (up to 30 m³/m²-h) in the column for at least one week and neither disruption of the resin nor desorption of AQDS was detected. Furthermore, the ion exchange resin kept more than 97% of its original capacity to immobilize AQDS within wide ranges of pH (4-10) and temperature (25-55° C.). Considering all this information, it can be concluded that the AQDS-saturated resin is suitable for its application under the conditions usually prevailing in conventional continuous bioreactors.

FIG. 1 shows the isotherms of adsorption of AQDS in AMBERJET 4600 CL resin at 25° C. and different pH values. ◇, pH=6; □, pH=7; Δ, pH=8.

Decolorization assays were conducted in 120-mL glass serum bottles with the basal medium described above. The concentration of $NaHCO_3$ was modified to 5000 mg/L in order to create a proper buffer (pH 7.2) with a head-space of $N_2/CO_2$ (80%/20%). Portions of the basal medium (50 mL) were placed in serum bottles, which were then inoculated with the stabilized anaerobic granular sludge at 30 g volatile suspended solids (VSS)/L. Inoculated bottles were immediately sealed with rubber stoppers and aluminum caps. Anaerobic conditions were established by flushing the head-space (70 mL) of the bottles with a mixture of $N_2/CO_2$ (80%/20%) for 5 min. All bottles were supplied with glucose as energy source (1 g COD/L) and pre-incubated at 25° C. during 12 h. After the pre-incubation period, bottles were flushed again with the same gas mixture and were supplied with an extra pulse of glucose (1 g COD/L). The azo dye, RR2, was added at the initial concentration of 0.3 mM from a sterilized anaerobic stock solution. Three experimental treatments were included in the protocol in order to elucidate the catalytic impact of immobilized AQDS on the reductive decolorization of RR2. Firstly, a sterile control provided with nutrients (basal medium), glucose, sludge and immobilized AQDS, which was sterilized in an autoclave under conventional conditions. Another control included active sludge, provided with nutrients and glucose, but in the absence of AQDS. Finally, another treatment contained active sludge supplemented with nutrients, glucose and AQDS-saturated resin. AQDS-saturated resin was prepared under the experimental conditions described above. AQDS-saturated resin was added during the inoculation procedure to obtain an AQDS concentration of 4.8 mM. All experimental treatments were carried out by triplicate.

Figure 2:
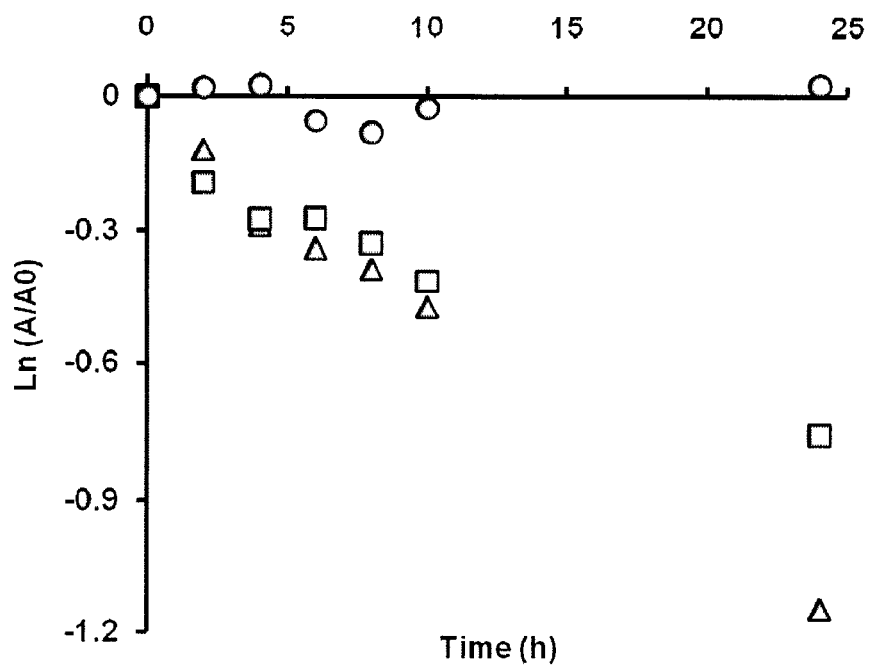
FIG. 2 shows the decolorization of RR2 (0.3 mM) by anaerobic granular sludge (30 g VSS/L) with glucose (1 g COD/L) as external electron donor. Data represent average from triplicate incubations. Symbols: ○, sterile control including AQDS-saturated resin; □, active sludge in the absence of AQDS; Δ, active sludge supplemented with AQDS-saturated resin. AQDS concentration provided at 4.8 mM.

Decolorization of RR2 followed first-order kinetics in all experimental treatments evidenced by the high coefficient of determination ($r^2$>0.98) obtained in all incubations performed. The first-order rate constants of decolorization of RR2, obtained under the applied conditions, were calculated according to the following equation:

$$A_t = A_o \cdot e^{-Kd \cdot t}$$

where:
$A_t$=absorbance at a given time (t)
$A_o$=absorbance at time zero
Kd=first-order rate constant of decolorization
t=time FIG. 2 shows the decolorization of RR2 under the experimental conditions applied. No significant (<5%) decolorization of RR2 occurred in sterile controls. The catalytic effect of immobilized AQDS in biologically active incubations was reflected on a 1.63-fold higher Kd value compared to the control lacking AQDS. Furthermore, immobilized AQDS not only accelerated the reduction of RR2 by the anaerobic sludge, but also improve the extent of decolorization of this contaminant. Indeed, 97% of RR2 initially added was decolorized in AQDS-supplemented cultures, whereas only 74% of decolorization occurred in the absence of AQDS.

EXAMPLE 2

Figure 3:
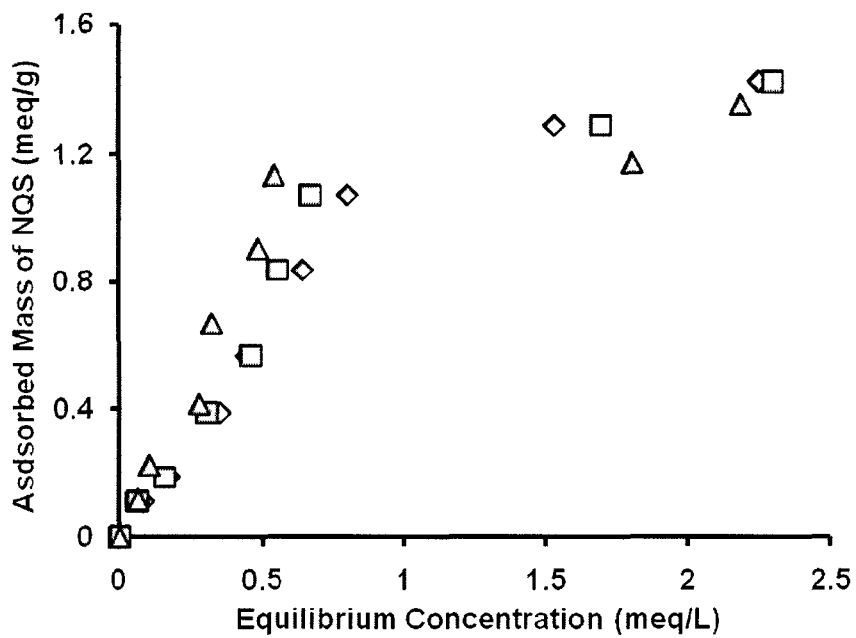
FIG. 3 shows the isotherms of adsorption of NQS in spherical ion exchange resin at different pH values. ◊, pH=6; □, pH=7; Δ, pH=8.

The following case was carried out under the same experimental conditions described on Example 1, except that the redox mediator immobilized in this case was 1,2-Naphthoquinone-4-sulfonate (NQS). FIG. 3 shows the isotherms of adsorption of NQS on the ion exchange resin described on Example 1. As occurred with AQDS, NQS-saturated resin showed stability within wide ranges of pH (4-10) and temperature (25-55° C.). NQS-saturated resin prevailed unaffected under the same hydraulic conditions described in Example 1 for AQDS-saturated resin. The maximum capacity of NQS adsorption achieved by AMBERJET 4600 CL resin was 1.39 meq/g, which was maintained after at least 5 experimental cycles.

FIG. 3 shows the isotherms of adsorption of NQS in spherical ion exchange resin at different pH values. ◊, pH=6; □, pH=7; Δ, pH=8.

Figure 4:
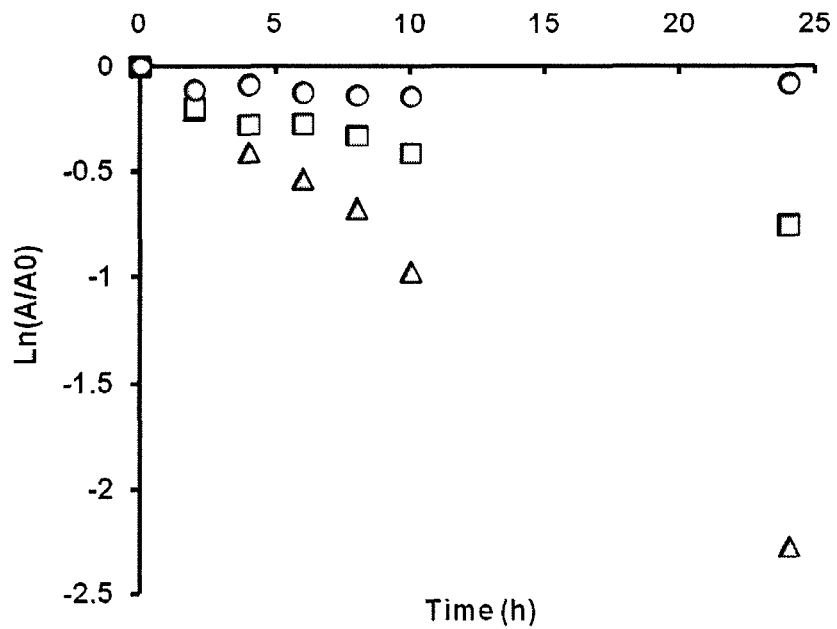
FIG. 4 shows the decolorization of RR2 (0.3 mM) by anaerobic granular sludge (30 g VSS/L) with glucose (1 g COD/L) as external electron donor. Data represent average from triplicate incubations. Symbols: ○, sterile control including NQS-saturated resin; □, active sludge in the absence of NQS; Δ, active sludge supplemented with NQS-saturated resin. NQS concentration provided at 4.8 mM.

Decolorization assays revealed that immobilized NQS on AMBERJET 4600 CL resin preserved its catalytic properties as evidenced on a 3.3-fold higher decolorization rate in NQS-supplemented cultures compared to the biologically active controls lacking this redox mediator (FIG. 4). Moreover, sterile control did not show significant decolorization of RR2 (<7%). The catalytic effect of immobilized NQS was also reflected in a greater extent of decolorization of RR2. Certainly, 97% of RR2 initially added was decolorized in NQS-supplemented cultures, whereas only 74% of decolorization occurred in the absence of immobilized NQS.

FIG. 4 shows the decolorization of RR2 (0.3 mM) by anaerobic granular sludge (30 g VSS/L) with glucose (1 g COD/L) as external electron donor. Data represent average from triplicate incubations. Symbols: ○, sterile control including NQS-saturated resin; □, active sludge in the absence of NQS; Δ, active sludge supplemented with NQS-saturated resin. NQS concentration provided at 4.8 mM.

EXAMPLE 3

Figure 5:
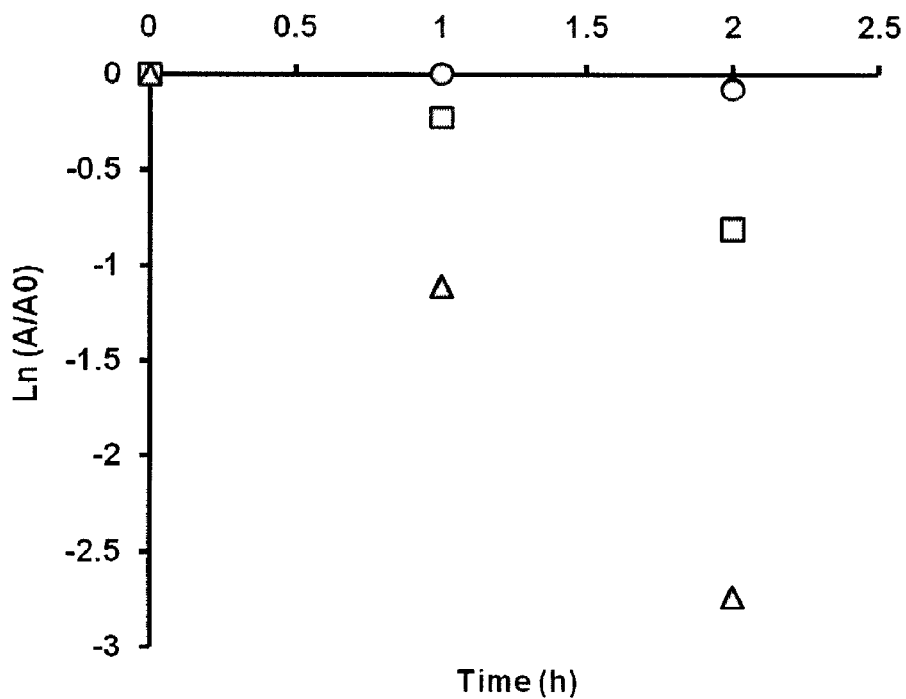
FIG. 5 shows the decolorization of MO (0.3 mM) by anaerobic granular sludge (30 g VSS/L) with glucose (1 g COD/L) as external electron donor. Data represent average from triplicate incubations. Symbols: ○, sterile control including AQDS-saturated resin; □, active sludge in the absence of AQDS; Δ, active sludge supplemented with AQDS-saturated resin. AQDS concentration provided at 4.8 mM.

The following case was carried out under the same experimental conditions described on Example 1, except that the azo dye decolorized here was Methyl Orange (MO). FIG. 5 shows the decolorization of MO in the different experimental treatments. It was evident that immobilized AQDS on AMBERJET 4600 CL resin had a catalytic effect on the decolorization of this azo dye. Immobilized AQDS increased 3.4-fold the decolorization rate, compared to the biologically active control lacking AQDS. Meanwhile, no significant (<5%) decolorization of MO occurred in sterile controls. Furthermore, immobilized AQDS no only accelerated the reduction of MO, but also improve its decolorization as MO was totally decolorized after 2 hours of incubation, whereas only 55.5% of MO was decolorized in the absence of AQDS.

EXAMPLE 4

Figure 6:
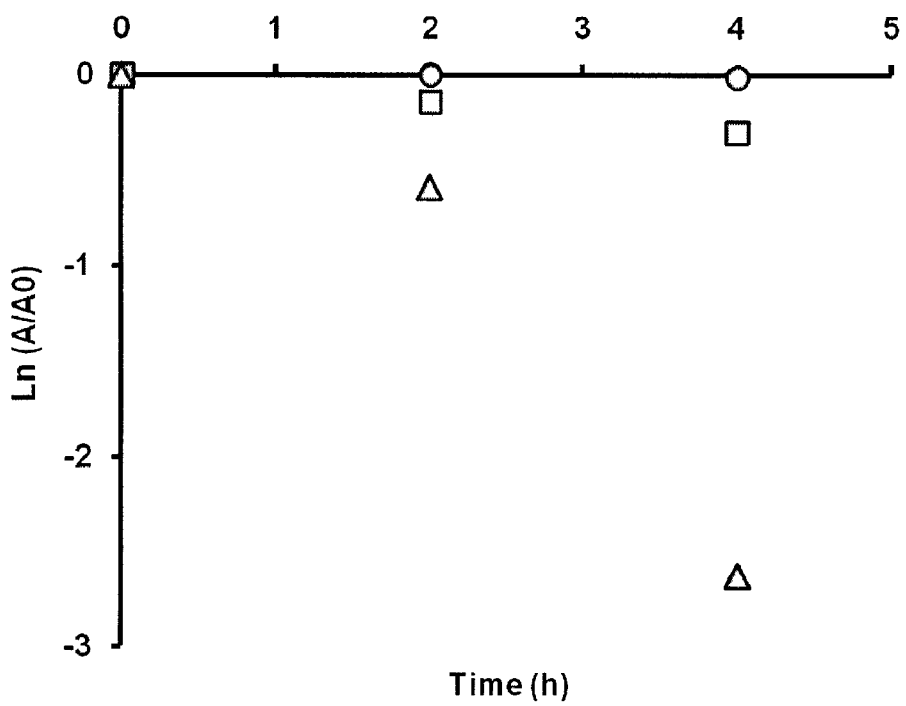
FIG. 6 shows the decolorization of MO (0.3 mM) by anaerobic granular sludge (30 g VSS/L) with glucose (1 g COD/L) as external electron donor. Data represent average from triplicate incubations. Symbols: ○, sterile control including NQS-saturated resin; □, active sludge in the absence of NQS; Δ, active sludge supplemented with NQS-saturated resin. NQS concentration provided at 4.8 mM.

The following case was carried out under the same experimental conditions described on Example 2, except that the azo dye decolorized here was Methyl Orange (MO). FIG. 6 shows the decolorization of MO in the different experimental treatments. It was evident that immobilized NQS on the ion exchange resin had a catalytic effect on the decolorization of this azo dye. Immobilized NQS increased 8.8-fold the decolorization rate, compared to the biologically active control lacking NQS. Meanwhile, no significant (<5%) decolorization of MO occurred in sterile controls. Furthermore, immobilized NQS no only accelerated the reduction of MO, but also improve its decolorization as MO was totally decolorized after 4 hours of incubation, whereas only 26% of MO was decolorized in the absence of NQS.

EXAMPLE 5

Figure 7:
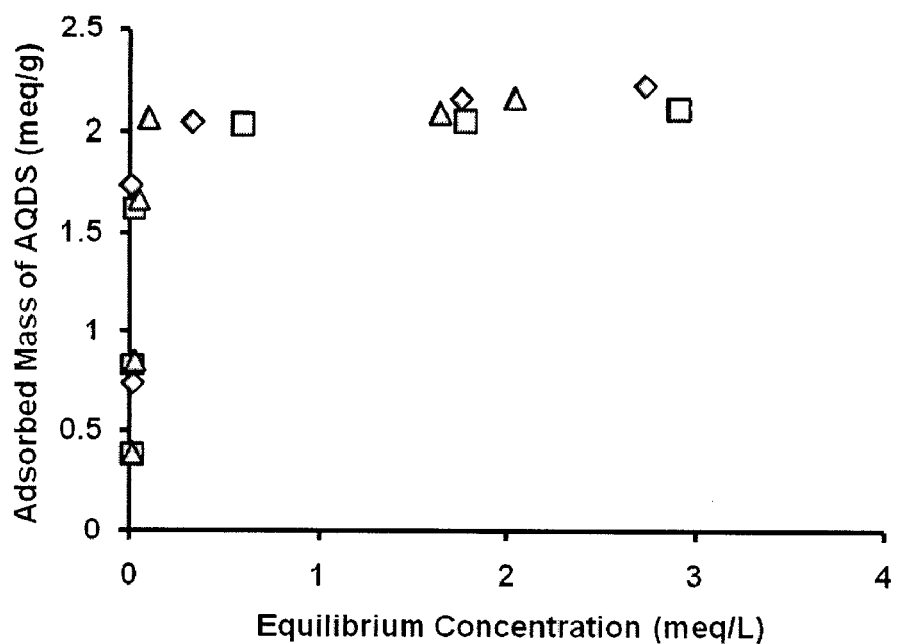
FIG. 7 shows the isotherms of adsorption of AQDS in fibrous ion exchange resin at different pH values. ◊, pH=6; □, pH=7; Δ, pH=8.

The following case was carried out under the same experimental conditions described on Example 1, except that the azo dye decolorized here was Methyl Orange (MO). Another difference with respect to Example 1 is that AQDS was immobilized in a different ion exchange resin. The ion exchange resin (FIBAN A-1 purchased from Institute of Physical Organic Chemistry of National Academy of Sciences of Belarus) utilized in the present experiment is non-porous, fibrous and with a nominal exchange capacity between 2.5 and 3.0 meq/g dry fiber, its swelling capacity is about 0.5-0.7 g $H_2O$/g dry fiber. FIG. 7 shows the isotherms of adsorption of AQDS on the ion exchange resin at different pH values. The ion exchange resin behaves as a strong base in a wide range of pH (4-12) and has specific weight of 0.83 g/$cm^3$. As occurred with the ion exchange resin described in Example 1, the AQDS-saturated resin described in the present example also prevailed unaffected at extreme hydraulic lading rates (up to 30 $m^3$/$m^2$-h) in the column for several days. Neither disruption of the resin nor desorption of AQDS was detected. Furthermore, the ion exchange resin kept more than 97% of its original capacity to immobilize AQDS within wide ranges of pH (4-10) and temperature (25-55° C.).

Figure 8:
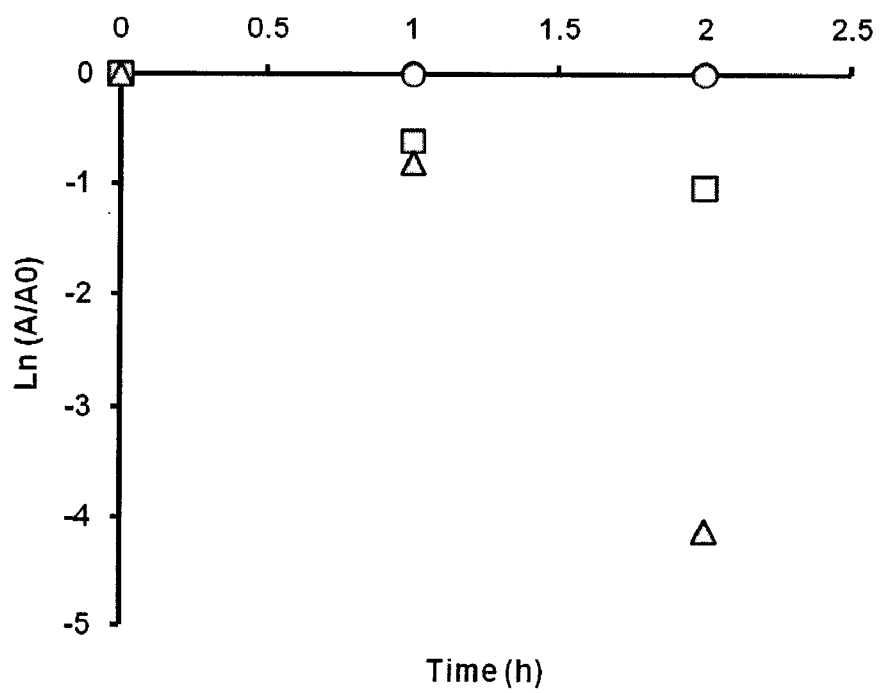
FIG. 8 shows the decolorization of MO (0.3 mM) by anaerobic granular sludge (30 g VSS/L) with glucose (1 g COD/L) as external electron donor. Data represent average from triplicate incubations. Symbols: ○, sterile control including AQDS-saturated fibrous resin; □, active sludge in the absence of AQDS; Δ, active sludge supplemented with AQDS-saturated fibrous resin. AQDS concentration provided at 4.8 mM.

Immobilized AQDS on FIBAN A-1 kept its catalytic properties, which increased 4-fold the Kd during the decolorization of MO (FIG. 8). Moreover, negligible (<1%) decolorization occurred in the sterile control. Furthermore, biologically active incubations provided with immobilized AQDS achieved complete decolorization of MO after 2 hours of incubation, whereas only 65% of decolorization occurred in the absence of immobilized AQDS.

FIG. 8 shows the decolorization of MO (0.3 mM) by anaerobic granular sludge (30 g VSS/L) with glucose (1 g COD/L) as external electron donor. Data represent average from triplicate incubations. Symbols: ○, sterile control including AQDS-saturated fibrous resin; □, active sludge in the absence of AQDS; Δ, active sludge supplemented with AQDS-saturated fibrous resin. AQDS concentration provided at 4.8 mM.

EXAMPLE 6

Theoretical

Figure 9:
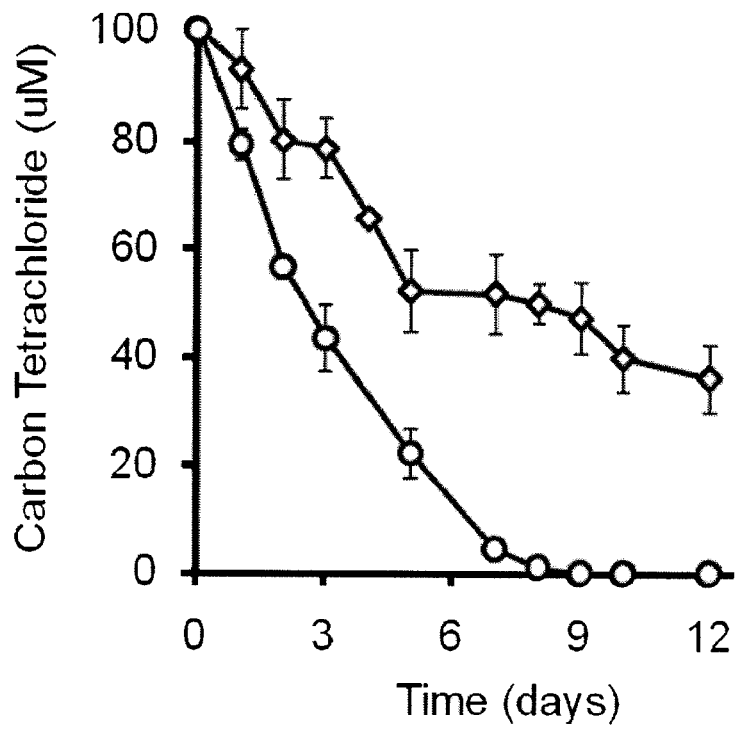
FIG. 9 shows the biodegradation of carbon tetrachloride (100 μM) by anaerobic granular sludge (30 g VSS/L) with glucose (1 g COD/L) as external electron donor. Data represent average from triplicate incubations. AQDS concentration provided at 4.8 mM.

The following case was carried out under the same experimental conditions described on Example 1, except that the contaminant degraded here was carbon tetrachloride (CT). FIG. 9 shows the biodegradation of CT in the different experimental treatments. It was evident that immobilized AQDS on AMBERJET 4600 CL resin had a catalytic effect on the biodegradation of this halogenated solvent. Immobilized AQDS increased 6-fold the conversion rate of CT, compared to the biologically active control lacking AQDS. Meanwhile, no significant (<2%) conversion of CT occurred in sterile controls including immobilized AQDS (data not shown). Furthermore, immobilized AQDS no only accelerated the reduction of CT, but also improve its extent of dechlorination.

Indeed, 70% of dechlorination (measured as free inorganic chlorine) of CT occurred in AQDS-amended cultures after 12 days of incubation, whereas only 30% of dechlorination was evident on biologically active controls lacking AQDS.

FIG. 9 shows the biodegradation of carbon tetrachloride (100 μM) by anaerobic granular sludge (30 g VSS/L) with glucose (1 g COD/L) as external electron donor. Data represent average from triplicate incubations. AQDS concentration provided at 4.8 mM.

EXAMPLE 7

Theoretical

Figure 10:
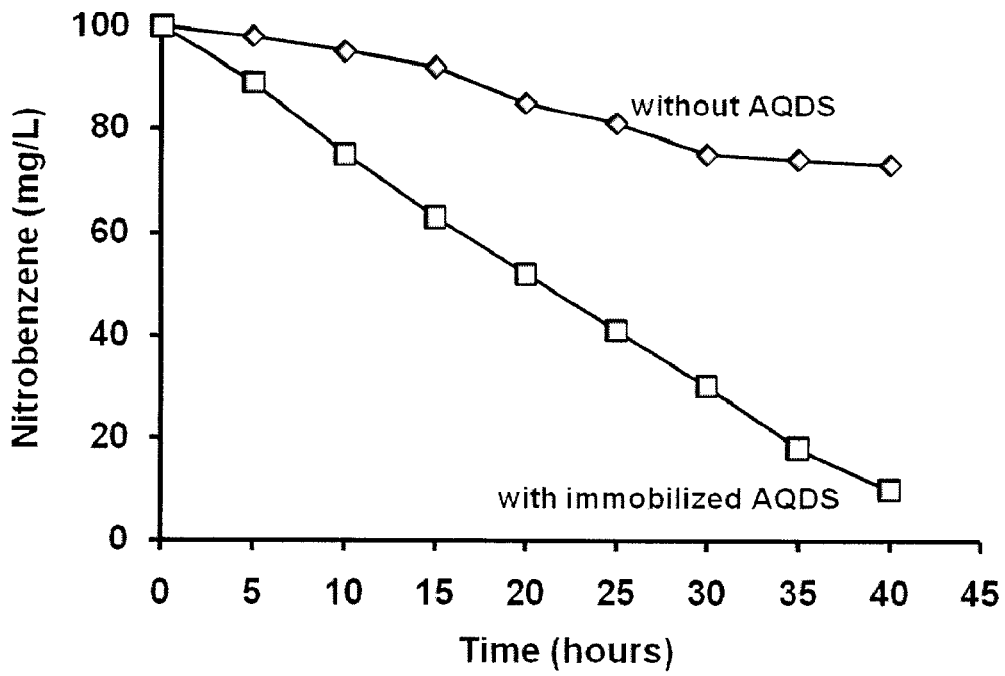
FIG. 10 shows the reductive transformation of nitrohenzene (100 mg/L) by anaerobic granular sludge (30 g VSS/L) with glucose (1 g COD/L) as external electron donor. Data represent average from triplicate incubations. AQDS concentration provided at 4.8 mM.

The following case was carried out under the same experimental conditions described on Example 1, except that the contaminant degraded here was nitrobenzene (NB). FIG. 10 shows the reductive transformation of NB in the different experimental treatments. It was evident that immobilized AQDS on AMBERJET 4600 CL resin had a catalytic effect on the reduction of NB. Immobilized AQDS increased 6-fold the conversion rate of NB, compared to the biologically active control lacking AQDS. Meanwhile, no significant (<2%) conversion of NB occurred in sterile controls including immobilized AQDS (data not shown). Aniline was detected as the final product from NB reduction. The extent of NB reduction was 90% in the presence of immobilized AQDS, but only 27% of reduction occurred in the absence of this immobilized quinone.

EXAMPLE 8

Theoretical

In the following example the capacity of immobilized AQDS on AMBERJET 4600 CL resin to improve the decolorization of RR2 in continuous lab-scale UASB reactors was evaluated. AQDS was immobilized on AMBERJET 4600 CL resin under the experimental conditions described on Example 1 (25° C., pH 7). AQDS-saturated resin was placed in a 2-L UASB reactor to obtain an AQDS concentration of 5 mmol/$L_{reactor}$. A reactor control was also installed under the same experimental conditions, but in the absence of AQDS. Both reactors were placed in a 25° C. room and seeded with anaerobic granular sludge (30 g of VSS/L). The lab-scale UASB reactors were fed with a volatile fatty acids mixture (acetate:propionate:butirate=1:1:1 based on COD ratio) at a final concentration of 1.5 g COD/L prepared in basal medium. The concentration of the azo dye RR2 was kept at 200 mg RR2/L throughout the study. The UASB reactors were operated at a hydraulic residence time of 6 hours and with an upflow velocity of 2 m/h.

The basal medium contained (mg/L): $NaHCO_3$ (1000) $NH_4Cl$ (280), $K_2HPO_4$ (250), $MgSO_4·7H_2O$ (100), $CaCl_2·2H_2O$ (10) and 1 ml/L of micro-nutrients and the pH was adjusted to 7 in the influent. Decolorization of RR2 was determined spectrophotometrically at the RR2's wavelength of maximum absorbance (539 nm). Liquid phase samples (0.75 ml) were centrifuged (10000 g, 3 min) and diluted up to an absorbance of less than 1 in a phosphate buffer (10.86 g $l^{-1}$ $NaH_2PO_4·2H_2O$; 5.38 g $l^{-1}$ $Na_2HPO_4·H_2O$). The buffer contained freshly added ascorbic acid (200 mg L) to prevent autooxidation reactions.

Figure 11:
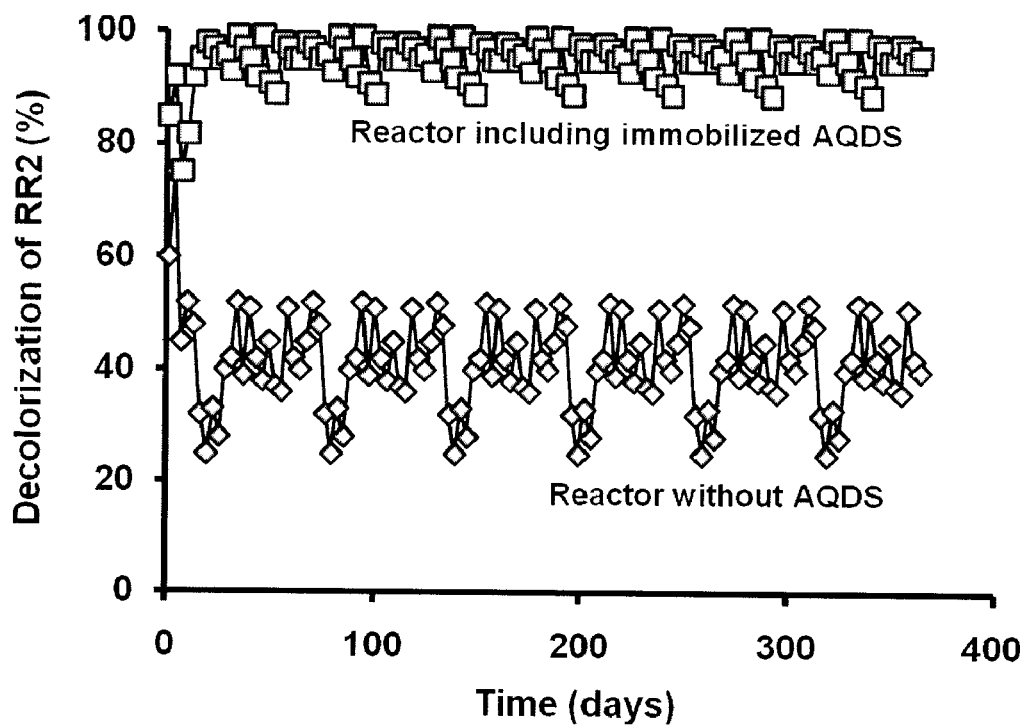
FIG. 11 shows the decolorization of RR2 in UASB reactors in the absence and in the presence of immobilized AQDS. AQDS was supplied in the AQDS-amended reactor at the initial concentration of 5 mmol/L$_{reactor}$ immobilized on AMBERJET 4600 CL resin.

FIG. 11 shows the decolorization of RR2 achieved by both UASB reactors during one year of operation. AQDS-supplemented reactor achieved 95% of decolorization of RR2 and showed stable performance during the whole experimental period. In contrast, the UASB reactor lacking AQDS showed unstable performance due to accumulation of RR2 in the reactor during several periods and achieved only 41% (average) of decolorization of RR2.

EXAMPLE 9

Theoretical

In the following example the capacity of immobilized humic acids (HA), on AMBERJET 4600 CL resin (ROHM and HAAS), to improve the reductive dechlorination of carbon tetrachloride (CT, generated in a gas emission) was evaluated in continuous lab-scale trickling filters. HA (Leonardite purchased from International Humic Substances Society, IHSS) were firstly sulfonated by the method described by Yudov et al. (2005) in order to insert the proper groups required for immobilization in anionic exchange resins. Sulfonated HA were then immobilized on AMBERJET 4600 CL resin under the experimental conditions described on Example 1 (25° C., pH 7), which was used as supporting matrix in the trickling filter. HA-saturated resin was placed in a 1.5-L glass cylinder (diameter: 5 cm, height: 39 cm) to obtain an HA concentration of 200 mg/$L_{reactor}$. A trickling filter control was also installed under the same experimental conditions, but in the absence of HA. Both cylindrical filters were placed in a 25° C. room and seeded with anaerobic sludge (30 g of VSS/L). Gas-phase CT was introduced to the bottom of the trickling filters by a syringe pump at a concentration of 50 ppmv (mg CT per gas litre). The lab-scale trickling filters were fed with a liquid phase in order to provide with the nutrients, co-substrate, buffer capacity and humidity required in the degradation process. A mixture of volatile fatty acids (acetate:propionate:butirate=1:1:1 based on COD ratio) at a final concentration of 500 mg COD/L was included as co-substrate in basal medium. The trickling filters were operated at a hydraulic residence time of 6 hours and with an upflow velocity of 2 m/h. The gas phase retention time was set at 2 min. The basal medium contained (mg/L): $NaHCO_3$ (1000), $NH_4Cl$ (280), $K_2HPO_4$ (250), $MgSO_4·7H_2O$ (100), $CaCl_2·2H_2O$ (10) and 1 ml/L of micro-nutrients and the pH was adjusted to 7.

The CT removal efficiency was determined by monitoring the CT concentration on inlet and outlet gas-phase samples. CT concentrations were determined by a chromatographic method previously reported (Cervantes et al. 2004).

Figure 12:
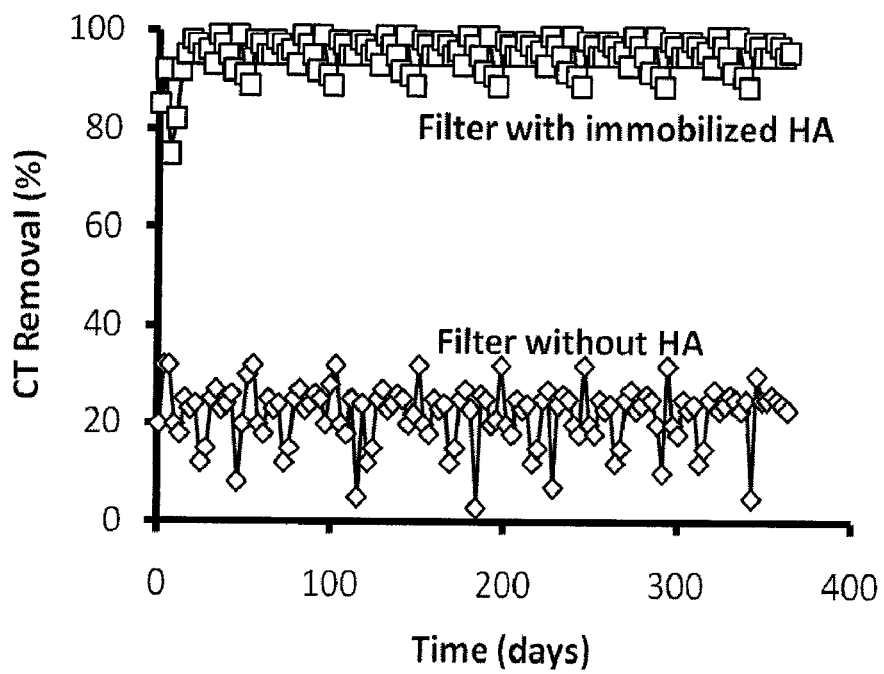
FIG. 12 shows the removal of carbon tetrachloride in trickling filters in the absence and in the presence of immobilized HA. HA were supplied in the HA-amended reactor at the initial concentration of 100 mg/L$_{reactor}$ immobilized on AMBERJET 4600 CL resin.

FIG. 12 shows the CT removal efficiency achieved by both trickling filters during one year of operation. HA-supplemented filter achieved 95% of CT removal and showed stable performance during the whole experimental period. In contrast, the trickling filter lacking HA showed unstable performance and achieved only 22% (average) of CT removal. Furthermore, no accumulation of intermediates occurred in the HA-supplemented filter. In contrast, chloroform and dichloromethane were detected as the main products obtained in the trickling filter lacking HA during dechlorination of CT.

What is claimed is:

1. A method for binding redox mediators to ion exchange resins comprising:
    saturating said ion exchange resin with said redox mediator by electrostatic attraction until reaching adsorption equilibrium by constant stirring;
    wherein said redox mediators are selected from quinones or humic substances; and
    wherein said quinones include functional groups selected from sulphate, phosphate or amino.

2. The method according to claim 1, wherein said humic substances have been modified with functional groups selected from sulphate, phosphate or amino.

3. A redox mediator for the treatment of electron-withdrawing pollutants, wherein said redox mediator is immobilized in an ion exchange resin produced by saturating said ion exchange resin with said redox mediator by electrostatic attraction until reaching adsorption equilibrium by constant stirring;

wherein said redox mediators are selected from quinones or humic substances; and wherein said quinones include functional groups selected from sulphate, phosphate or amino; and wherein said humic substances have been modified with functional groups selected from sulphate, phosphate or amino.

* * * * *